Dec. 28, 1926.　　　　　J. N. ROCK ET AL　　　　　1,612,058
AIR BRAKE SYSTEM
Filed Nov. 26, 1924　　　　3 Sheets-Sheet 3
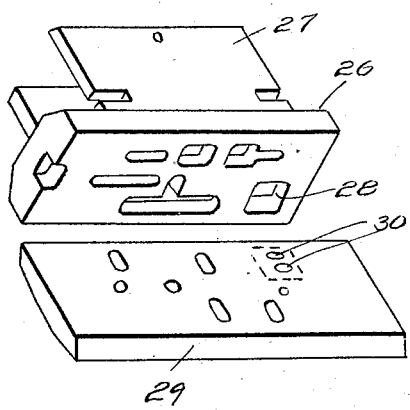
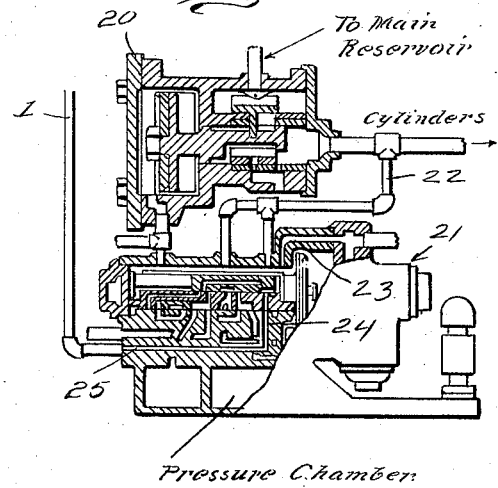
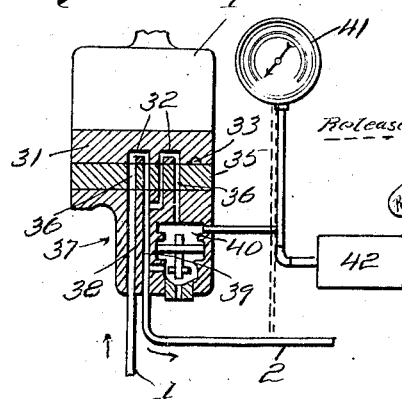
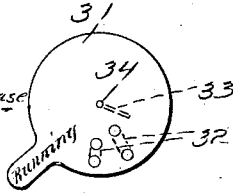
Inventor
J. N. Rock and
E. A. Vail.
By Clarence A. O'Brien.
Attorney Patented Dec. 28, 1926.

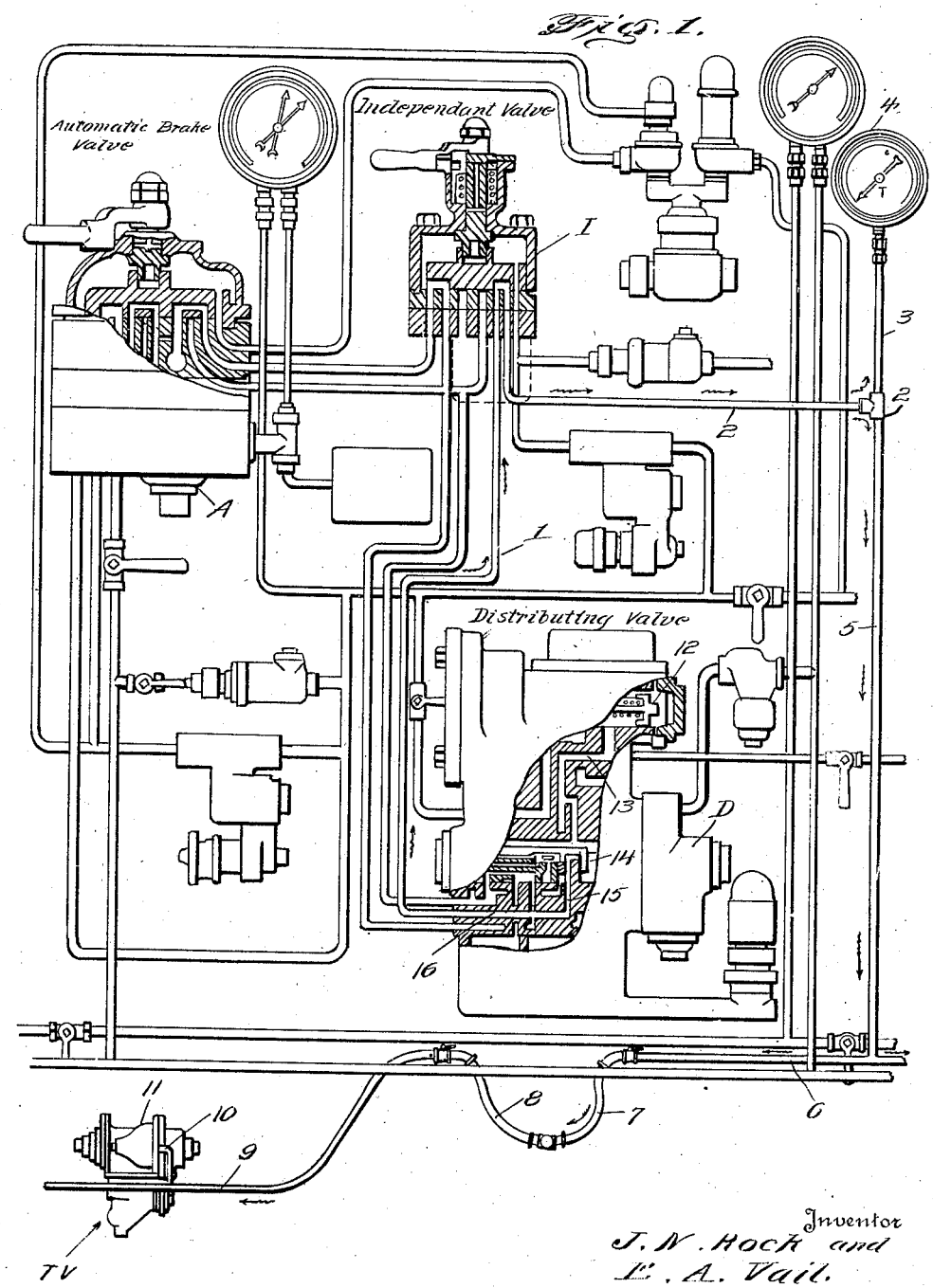

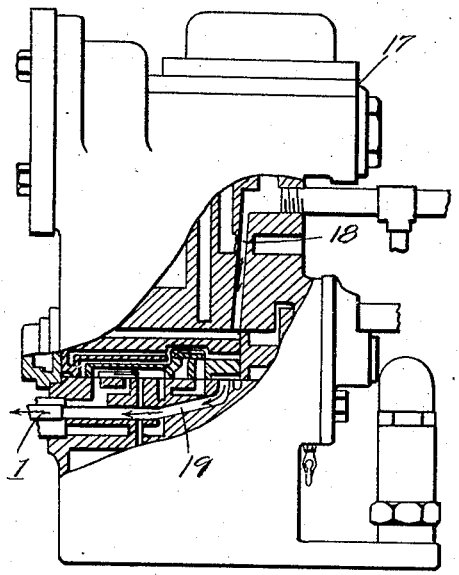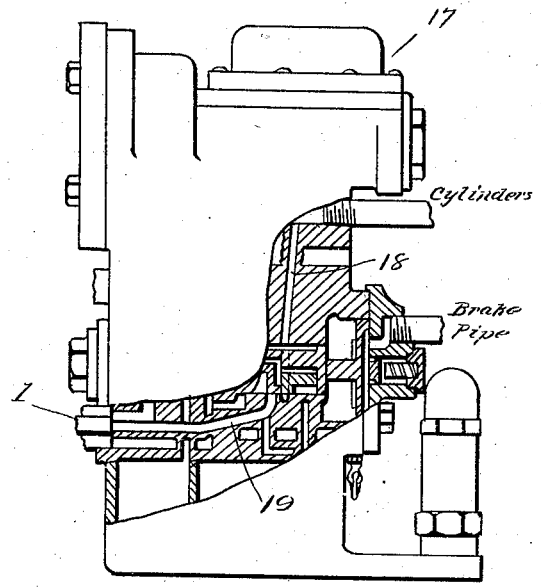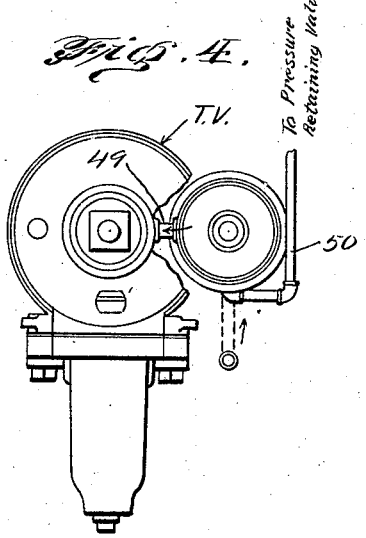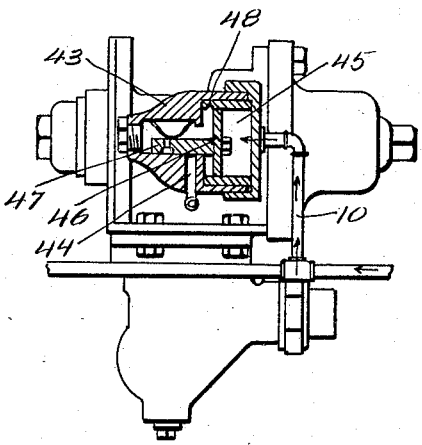

1,612,058

UNITED STATES PATENT OFFICE.

JACOB N. ROCK AND ELMER A. VAIL, OF SALT LAKE CITY, UTAH.

AIR-BRAKE SYSTEM.

Application filed November 26, 1924. Serial No. 752,375.

This invention relates broadly to an improved air brake system, but it has more specific reference to an auxiliary device, to be embodied in well known and already existing systems, now used by prominent railroads of the country, the presence of this additional device permitting absolute and full control of both engine and train brakes.

More specifically speaking, the present invention is an improvement upon Westinghouse engine, tender and train brake equipment known as E. T. equipment of various kinds.

In carrying out the invention, we seek to improve upon a brake of this type, rather than to create a new one. It therefore follows that the present invention relates particularly to supplemental means which is embodied in a brake system of the type specified for enabling results heretofore not obtained to be positively accomplished.

In air brake systems of the specific kind mentioned, it is not possible to charge the auxiliary reservoir of a train, while the brakes are set. In order to accomplish this result, it is essential to release the train brake. After a full service application, if the brakes fail to hold, the control of the same by the engineer would end, the only remedy being that the pressure retaining valve could be closed, but this is only partially effective. Then too, in a brake of this type, an emergency application cannot be made, after full service application of the brakes.

Confronted with the foregoing objectionable features of the present day brake equipment, we propose to improve upon the same, by incorporating thereinto, either in the form of an attachment or otherwise, novel means, which will permit a train brake to be held set, while releasing the engine brakes, or to allow the train brakes to release, while the engine brake is set, the improvements being so constructed and placed, as to permit application or release of the train brake or engine brake independently of each other, or both at the same time.

While the improved device could be embodied in the existing brake system, in some other manner, we have shown the same in the form of an attachment, and when it is understood, it will be seen that we provide first a slightly modified conventional distributing valve, second, a modified and improved independent brake valve; and further, an augmented triple valve.

Broadly construed, we provide a valved by-pass or conduit, which leads from, and has communication with the application chamber of the distributing valve, extends to, and is manually controlled by the independent brake valve, and extends from the latter to, and has communication with the triple valve through the medium of an automatic pressure controlled auxiliary valve. It is not essential, however, that the independent valve be present in this arrangement.

The effect of this arrangement is that a means is afforded, for permitting what may be referred to as a straight application of air from the main reservoir through the triple valve, and into the brake cylinder for maintaining the brakes set, for a predetermined time and for permitting simultaneous recharging of the auxiliary reservoir.

In order to enable a clear comprehension of the invention to be had, we have illustrated the same, embodied in an air brake system of a conventional type.

In the accompanyng drawings:

Figure 1 is a diagrammatic view, partly in section, and partly in elevation, showing our improved air brake system.

Figure 2 is an enlarged elevational view, with a portion broken away, and shown in section, illustrating a conventional Westinghouse distributing valve in the release or running position modified to adapt it for use with the present device and showing open communication between the application chamber and valved by-pass.

Figure 3 is a view, like Figure 2, showing the distributing valve in emergency position with the slide valve closing communication between the application chamber and the valved by-pass.

Figure 4 is an end elevation of a conventional form of triple valve, showing the auxiliary valve attached thereto.

Figure 5 is a side elevation of the triple valve, showing the auxiliary valve in section with the exhaust port of the latter covered.

Figure 6 is a detail perspective view of an equalizing slide valve, of the type employed in the distributing valve, seen in Figures 2 and 3, both parts being conventional, but supplied with additional ports.

Figure 7 is a sectional view, partly in elevation, showing a different embodiment of distributing valve, modified in accordance with the present invention.

Figure 8 is a detail section of the manually operated control valve, which may constitute a part of the independent brake valve, and Figure 9 is a bottom plan view of the movable port controlling disc of the last named valve.

Directing attention first to Figure 1, it will be seen, as before stated, that a diagrammatic view of the improved air brake system is shown.

In this figure, most of the parts seen are conventional, and it is obvious that the reference character D, designates generally a conventional form of distributing valve. A denotes a common automatic brake valve, while the letter I represents generally the engineer's independent brake valve. Equalizing valves, gauges, cut off cocks, and a pressure retaining valve are among the well known details constituting a part of the disclosure here made. In carrying out the present invention, the distributing valve and the independent brake valve are preferably reconstructed or modified, this being essential so far as the distributing valve is concerned, but not necessary, so far as the independent brake valve is concerned. Also, the letters T. V. designate a conventional triple valve.

In the showing, this triple valve is left unchanged, in so far as the internal construction is concerned. As the improved device is entirely supplemental to the brake system now used, we wish it to be understood that the improvement adds to the efficiency of both the independent and automatic brakes, without lessening the efficiency of either, at any time, or under any conditions.

As before stated, the improved structure might be broadly referred to, as a valved by-pass extending from a source of compressed air supply to the triple valve, for communication with a brake cylinder, in association with the latter. The by-pass, however, is actually composed of a number of sections of pipes. The first section is designated by the reference character 1, and this extends from the distributing valve D (see Fig. 1) to the independent brake valve I. Extending from the latter is another section 2, which, through the medium of a coupling 2' connects with a short section 3, leading to a pressure gauge 41. Extending downwardly from the coupling 2' is a section 5, which connects at the bottom with a horizontal section 6. The section 6 is equipped at one end with a flexible coupling tube 7, detachably connected or coupled with a complemental flexible tube 8. The latter is connected with another section of pipe 9, which in turn connects with a branch 10, leading to an automatic pressure controlled auxiliary valve 11, in association with the aforesaid triple valve T. V. The section 6 may be considered as an auxiliary brake pipe, extending alongside of the main brake pipe of one car, while the section 9 may be considered as a corresponding part of an adjoining car.

The by-pass or auxiliary brake pipe leads from and is under predetermined conditions, in communication with the application chamber 12 of the distributing valve D. In the present instance, the valve D must be modified by providing a passage 13, extending from this chamber and communicating with the slide valve seat 14. A branch passage 15 extends from the valve seat and is controlled by the slide valve and communicates with the horizontal branch 16, which connects with the aforesaid pipe section 1. Inasmuch as the distributing valve may vary in construction, we have also shown additional forms in Figures 2, 3, and 7. The distributing valve in Figures 2 and 3 is designated by the reference character 17, and is in the form of a single casting, and the web portion existing between the application chamber and slide valve chamber is bored to provide a passage 18 connecting the application chamber to the slide valve chamber and through the medium of pipe section 1 passage 19. While it is true that the boring web connects the application chamber and slide valve chamber so far as the cylinders in the casting are concerned, it must be so constructed that no air from the application chamber enters into the slide valve chamber, but must pass through the valve seat and on through the pipe 1 without entering into the slide valve chamber. The air follows the course indicated by the arrows.

In Figure 7, we show a different type of distributing valve which is made up of the parts 20 and 21, respectively, joined together by piping 22. The pipe 23 is ours and requires the provision of an additional port or passage in the part 21. Likewise, the part 21 is provided with branches 24 and 25, for conducting air from the valve into the auxiliary conducting pipe 1.

Shown in Figure 6 is an equalizing slide valve 27, the part 26 of which is provided with an additional opening 28, and the part 29 of which is provided with ports 30, to register therewith at the proper time.

Thus, it will be seen that in carrying out the invention, we must provide a modified or improved distributing valve.

It is also desirable to provide an appropriate manually operated controlling valve, for permitting flow of air through the auxiliary conduit, only at the proper time.

While this control valve could be separate and independent, and arranged at some other place, we prefer to associate it with the independent brake valve I. Directing attention to Figure 8, it will be seen that in accomplishing this result, the movable disc 31 of this valve is provided with two additional U-shaped passages 32, in its under face. It is also provided with a groove 33, in this face, leading to a central exhaust port 34. The complemental disc 35 is provided with spaced parallel pairs of passages 36, for alignment with the passages 32. Attached to the under side of the disc 36 is a casting 37, provided with spaced parallel bores 38, and 39, with which the branches 1 and 2 of the auxiliary conduit or by-pass pipes connect. The bore 39 affords communication with the equalizing valve chamber 40, gauge 41, and equalizing reservoir 42. This arrangement permits a graduated release through the auxiliary control brake valve of the air in the brake cylinders, while the automatic brake valve is in charging or holding position.

Considering further the aforesaid auxiliary pressure controlled valve 11, and directing attention to Figures 4 and 5, it will be seen that the same comprises a casing of the shape shown at 43, provided with an exhaust passage 44, and a slide valve chamber 45. The branch pipe 10 leads to the chamber 45. A slide valve, indicated generally by the numeral 46, is operable in this chamber, and serves to automatically control the passage of air through this auxiliary valve. The valve is provided with a port 47, for cooperation with the exhaust 44. The wall of the valve chamber is provided with a feed groove 48, and when the air moves the valve to a predetermined position toward the left, it is obvious that air passing from the pipe 10 escapes by the groove to the left hand side of the slide valve head. It is then free to pass from the valve casing 43, through a laterally disposed pipe 49, which, in the present instance, is connected to the exhaust port of the triple valve T. V. A pipe 50 connects with the exhaust and leads to a pressure retaining valve (not shown). Here it might be stated that the pressure retaining valve is not essential, in view of the improved construction.

From the foregoing, it is obvious that we simply extend a conduit from the distributing valve to the independent valve, where there is a supplemental port for controlling the passage of air therethrough. The conduit leads from this control valve to the auxiliary automatically operating valve carried by the triple valve, and at a predetermined time, air is permitted to pass through the auxiliary valve, and also through the triple valve, into the brake cylinder. As before stated, the presence of the independent control valve is not essential.

Here is an illustration of the practical application of the system.

In making a stop, the engineer makes a reduction in the brake pipe or train line, through the use of the automatic brake valve. The distributing valve controls the flow of air from the main reservoir to the brake cylinders of the engine, and also automatically controls the flow of air through the auxiliary conduit, which we have provided. Thus, the air passing through the independent brake valve, which is normally in running position charges the auxiliary conduit with the same pressure as in the engine brake cylinder. The valve 46 in the casing 43 is thus forced in a direction from right to left. Air escaping by the groove 48 fills the chamber 45, on opposite sides of the valve head. Now, when the exhaust port of the triple valve is opened, direct communication is afforded between the auxiliary valve and brake cylinder. Hence in a measure, a direct air line is extended from the main reservoir to the brake cylinder, for holding the brakes set, at which time the auxiliary reservoir may be simultaneously charged. Instead of holding the engineer's automatic brake valve in lap position, which is necessary in the existing brake system, to hold the train brakes set, it should be put in release, and then into holding position to prevent overcharging the train line, and thus charge the auxiliary reservoir. In the usual system this would release the brakes. If there is greater pressure in any one of the brake cylinders of a train than in the auxilary conduit or by-pass, it will force the slide valve of the auxiliary valve 11 to a position to permit air to exhaust, until the pressure is equalized, and if any cylinder has less pressure than the auxilary conduit, the pressure from the latter will force the piston 46 ahead and charge the brake cylinder to equal pressure. This equalizing feature will supply all leaks that may occur in the brake cylinder and the air in the auxiliary conduit is drawn from the main reservoir in a constant supply.

The operation through the independent brake valve, as improved, is as follows:

When it is desired to release the train brake, without releasing the engine brake, the handle on the control brake valve is turned to release position, as indicated in Figure 9, thus placing the port or groove 33 over and in communication with the adjacent bore or passage 36, and connecting the auxiliary conduit 2 to the exhaust 34. If it is desired to release the engine brake only, the handle of the independent brake valve would be returned to released position. If it is desired to increase the pressure in the brake cylinder, place the independent brake valve, as it is now constructed, in the application position, and increase the pressure of the application chamber, then return to running position. This independent application can be graduated to apply considerably less pressure than an automatic application.

From the foregoing arrangement, it is obvious that the brake may be made a "continuous brake" in operation, the pressure in all of the brake cylinders being equalized either in automatic or independent application, supplying air to the brake from the main reservoir. Stops can be made quicker and smoother, either in single cars or trains, and the sliding of the wheels is reduced to a minimum, and an altogether quicker and better stop can be made. The system is always fully charged for emergency stops, either on up-grades, down grades, or levels, saving all of the air that is now wasted in descending grades, and thereby relieving the air pump of all excessive work. The pump is not called upon to do any more work on down grades than on an up grade, and no air is wasted except that which leaks and used in releasing the brakes. The brake or brakes can be released automatically or independently as desired, and graduated off either with the independent or automatic brake valve.

In the ordinary piston, the automatic brake valve alone permits the brakes on both the engine and train to be set simultaneously only, but allows them to be released simultaneously or separately. Moreover in the system now in use the independent valve permits the engine and tender brakes only to be set or released. By use of our device, which, as stated is incorporated into the ordinary brake system, the independent brake valves both, or either train and engine brakes may be set or released separately or simultaneously as desired and as conditions demand. The automatic brake valve will remain the same as ever, but our device gives to it the added function of holding the brakes on the train set while recharging the auxiliary reservoir. By placing the control valve on the engine side of the distributing valve instead on the same side, no auxiliary reservoir for it is necessary as it draws air direct from the application chamber and the brake cylinders, which have capacity enough to make additional storage unnecessary.

The other features and advantages of the invention have undoubtedly been made apparent from the foregoing description, taken in connection with the drawing.

Therefore, a more lengthy description is deemed unnecessary.

While we have shown and described the preferred embodiment of our invention, we wish it to be understood that any changes which fall within the field of invention claimed may be restored to, if desired.

Having thus described our invention, what we claim is:

1. An air brake system comprising a main reservoir, a distributing valve in communication therewith, a triple valve, an auxiliary pressure operated valve in communication with said triple valve, and a valved by-pass leading from said distributing valve to said auxiliary valve.

2. In combination with an air brake system embodying a main reservoir, a distributing valve in communication with said reservoir, an independent brake valve, an automatic brake valve, connections between said brake valves, and a triple valve in association therewith; of a valved by-pass between said distributing valve and triple valve for permitting air to be supplied directly from the main reservoir into and through the triple valve to be injected into a brake cylinder.

3. An air brake system of the class described embodying a distributing valve adapted to receive its air supply from a main reservoir, an independent brake valve, a supplemental control valve in association with said independent brake valve, a triple valve, an auxiliary valve communicating with the exhaust port of said triple valve, and a conduit leading from said distributing valve to said control valve, from the latter to said auxiliary valve; said auxiliary valve being automatic in operation.

4. In an air brake system of the class described, a triple valve embodying a slide valve chamber and having a port communicating with said chamber, an auxiliary valve embodying a fluid chamber having a discharge port in one side communicating with said port, and being provided with an exhaust passage leading from the central portion of said chamber, a pressure controlled slide valve in said last named chamber, and a valved fluid supply pipe communicating with one end of said chamber.

5. An air brake system of the class described embodying an auxiliary air supply conduit, and a manually operated control valve for said conduit embodying an equalizing valve, and an equalizing reservoir.

6. In an air brake system of the class described, an auxiliary fluid supply conduit, and an independent brake valve with which said conduit is connected, said independent brake valve embodying relatively movable discs for controlling the passage of air through said conduit, said conduits being provided with auxiliary ports and passages.

In testimony whereof we affix our signatures.

JACOB N. ROCK.
ELMER A. VAIL.